United States Patent [19]

Harris

[11] 4,026,058
[45] May 31, 1977

[54] FISH HOOK SETTER

[75] Inventor: Henry H. Harris, South Orange, N.J.

[73] Assignee: Elizabeth Clark, Newark, N.J.

[22] Filed: June 11, 1976

[21] Appl. No.: 695,141

[52] U.S. Cl. .................................................. 43/15
[51] Int. Cl.² ........................................ A01K 97/00
[58] Field of Search ........................ 43/15, 16, 21.2

[56] References Cited

UNITED STATES PATENTS 3,881,269  5/1975  Timmons ............................... 43/15

*Primary Examiner*—J.N. Eskovitz
*Attorney, Agent, or Firm*—Norman N. Popper

[57] ABSTRACT

A Fish Hook Setter wherein a releaseable, spring-loaded sleeve is normally urged into a tube and is lockable in extended position; when a fish nibbles at the bait, deflecting the fishing line, the sleeve is manually released and moves back into the tube; the sleeve is connected to a pivotably mounted fishing rod and socket which socket is jogged and jerks the fishing line to set a fish hook in the mouth of a fish.

1 Claim, 3 Drawing Figures

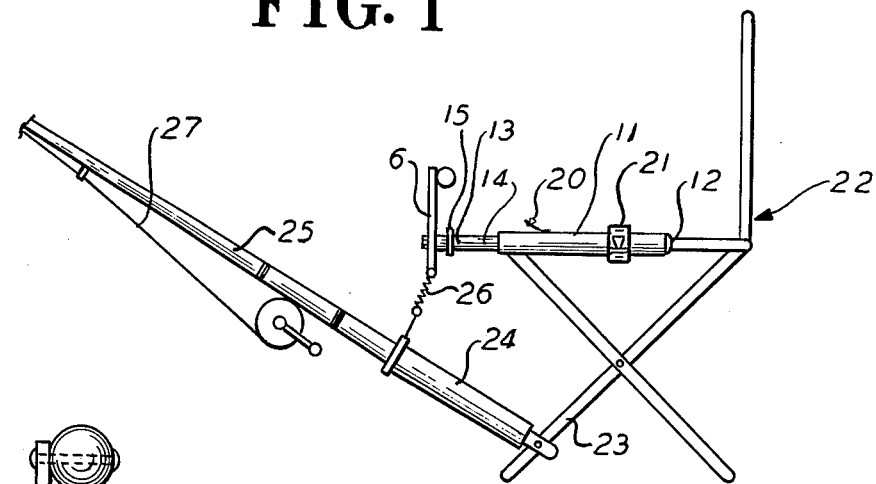
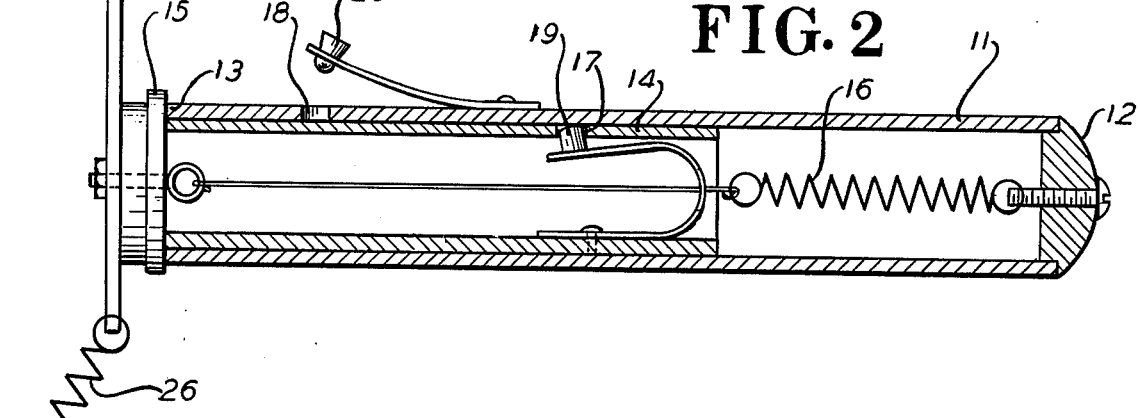
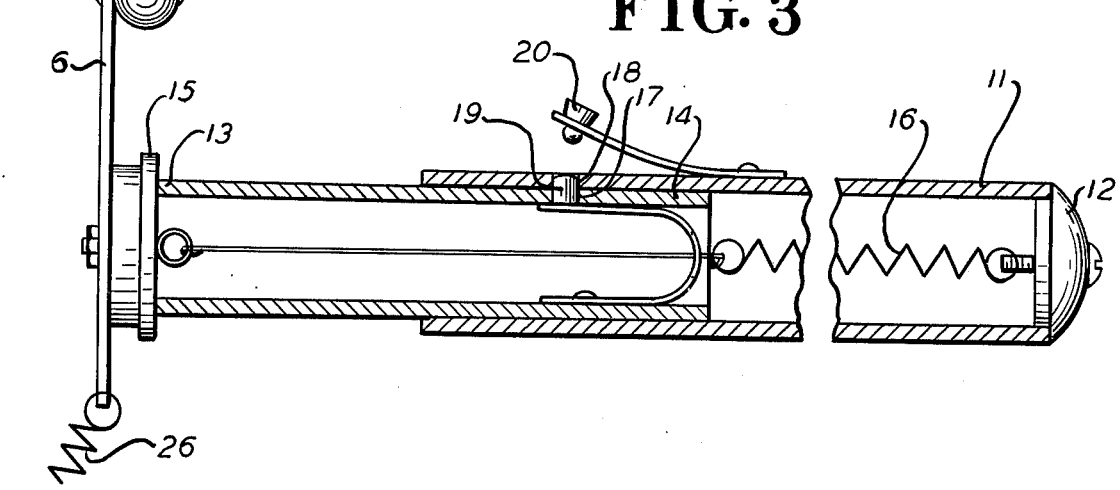

FISH HOOK SETTER

BACKGROUND OF THE INVENTION

1. Field of the Invention

This invention relates generally to fish hook setters and specifically to fish setters which are manually released so as to jog the fishing rod, jerk the fishing line and set a fish hook in the mouth of a fish.

2. Prior Art

Fishermen frequently desire not to hold a fishing rod but to rest it against an object, waiting until they detect a fish nibbling at the bait and then, to pick up the rod, jog the fishing rod to jerk the fishing line and set the fish hook in the mouth of a fish. Other fishermen may prefer the patented devices wherein a fish tugging at a fishing line, releases a mechanism that jogs the fishing rod and jerks the fishing line, hopefully to automatically set the fish hook in the mouth of the fish. Such fish hook setting devices are frequently insensitive to a fish nibbling at the bait and do not automatically release the mechanism that jogs the fishing rod and in so doing jerks the fishing line. Some of the devices are so sensitive to fish nibbling at the bait that the mechanism jogs the fishing rod before the fish attempts to swallow the bait, and in so doing fails to set the fish hook in the fish's mouth.

What is missing is the educated judgement of the fishermen who may know by watching the bending of the fishing rod, or the jerking of the fishing line, at just what point the rod should be jogged to jerk the fishing line and to set the fish hook in the mouth of the fish.

SUMMARY OF THE INVENTION

It has been found that a fish-hook setter can be devised which does not automatically jog the fishing rod and jerk the fishing line to set a fish hook in the mouth of a fish, but rather awaits the judgement of the fisherman to release a mechanism at what the fisherman judges to be the exactly correct moment when the fish is mouthing the bait, preparatory to chewing off a piece and by such judgement, the hook is set in the mouth of a fish. Such a fish-hook setter does not require the fisherman to hold the rod but he may rest it in a fishing-pole holder which is connected to a spring-loaded sleeve. The sleeve is movable back into a tube, but is locked in extended position. When the fisherman observing the deflection of the fishing pole and the movement of the fishing line, determines that the moment is ripe to set the hook, he depresses a button on the tube which releases the sleeve, which in turn jogs the fishing rod to jerk the fishing line and to set a fish hook in the mouth of the fish.

DESCRIPTION OF THE DRAWINGS

These objects and advantages as well as other objects and advantages may be attained by the device shown by way of illustration in the drawings in which:

FIG. 1 is a side elevational view of the fish-hook setter attached to a seat and connected to a pivotable socket for holding a fishing rod;

FIG. 2 is a vertical sectional view of the fish-hook setter with the sleeve retracted into the tube;

FIG. 3 is a vertical sectional view of the fish-hook setter with sleeve extended from the tube.

PREFERRED EMBODIMENT

Referring now to the drawings in detail, the fish-hook setter provides a hollow tube 11 which is closed at one end 12 and open at the other end 13. A sleeve 14 is slidable in and out of the tube 11. The end of the sleeve 14 at the open end 13 of the tube 11 is provided with a plate 15 which is attached to the sleeve 14 and prevents the sleeve 14 from being drawn completely into the tube 11. A spring is located in the tube 11. The spring 16 is attached at one end to the closed end 12 of the tube 11 and at the other end to the plate 15.

A spring 16 normally urges the sleeve 14 into the tube 11. Attached to the plate 15, mounted on the end of the sleeve 14, is a handle 6 to enable the sleeve 14 to be moved outwardly from the tube 11 into which it telescopes. By pressing on the handle 6, the sleeve 14 is extended from the tube 11. The sleeve 14 is provided with an orifice 17 and the tube 11 is provided with an orifice 18. The sleeve 14 is movable to a position wherein the orifice 17 is in registration with the orifice 18. At this point, a spring-loaded knob 19 moves from the orifice 17 into the orifice 18 and locks the sleeve 14 in extended position. A button 20 is mounted on the tube 11 and is movable into the orifice 18 as will be seen in FIG. 3, the button may be deflected to move into the orifice 18 and push the knob 19 out of locking engagement thereby releasing the sleeve 14 to permit the spring 16 to retract the sleeve into the tube 11 as shown in FIG. 2.

The tube 11 may be attached by a clamp 21 to a seat 22, such as a camp stool. Attached to the leg 23 of the camp stool and mounted pivotably thereon, a socket 24 or fishing pole holder is provided. The fishing pole 25 is placed with its end in the socket or holder 24. The socket 24 is connected by a spring 26 to the handle 6.

With the hook baited, the fisherman casts his line into the water and deposits the pole 25 in the socket 24. He is seated on a camp stool 22 and uses the handle 6 to extend the sleeve 14 out of the tube 11 until the knob 19 locks the sleeve 14 in extended position as shown in FIGS. 1 and 3.

The fisherman need not hold the fishing pole but can devote his entire attention to observing the inclination of the fishing pole 25 when a fish nibbles at the bait and further through observing whether the fishing line 27 appears to be deflected sufficiently to indicate that the fish has the bait in its mouth. When the fisherman has exercised his judgment in this regard, he presses the button 20, which releases the knob from detaining position and the spring 16 snaps the sleeve 14 back into the tube 11. The movement of the handle 6 is transmitted by the spring 26 to the fishing rod 25, to the line 27 and the hook on the end of the line is pulled swiftly and briefly to set the hook in the fish's mouth, thereby ensuring that the fish is securely hooked and may be brought to gaff or net.

By the use of the fish-hook setter, the tiring chore of holding the rod is avoided. The fisherman may devote his concentrated attention to observing the deflection of the pole and the movement of the line and be otherwise completely relaxed until such time as he presses on the button 20 to actuate the fish-hook setter.

What is claimed is:

1. A manually releasable fish-hook setter comprising:
   a. a tube,
   b. a sleeve slidable out of the tube,
   c. a spring attached at one end to the end of the tube, d. the other end of the spring attached to the sleeve,
e. the spring normally urging the sleeve into the tube,
f. a handle attached to the sleeve whereby the spring may be overcome and the sleeve slidably extended out of the tube,
g. the tube rigidly attached to a seat,
h. a fishing pole holder pivotably attached to the seat,
i. a spring connected between the holder and the handle,
j. an orifice in the tube,
k. an orifice in the sleeve,
l. the orifices in general registration with each other when the sleeve is extended out of the tube,
m. a spring-loaded knob in the sleeve movable into the orifices when in registration with each other, to lock the sleeve in extended position,
n. a spring-loaded button in the tube deflectable to enter the orifices and displace the knob, whereby the sleeve is released and moves back into the tube.

* * * * *